United States Patent
Lu

(10) Patent No.: US 6,412,613 B1
(45) Date of Patent: Jul. 2, 2002

(54) ELECTRIC BRAKE

(75) Inventor: Weimin Lu, Novi, MI (US)

(73) Assignee: Midwest Brake Bond Company, Warren, MI (US)

( * ) Notice: Subject to any disclaimer, the term of this patent is extended or adjusted under 35 U.S.C. 154(b) by 0 days.

(21) Appl. No.: 09/714,576

(22) Filed: Nov. 16, 2000

(51) Int. Cl.[7] ............................................. B60T 13/04
(52) U.S. Cl. .................. 188/171; 188/71.5; 188/264 E; 188/264 CC; 188/161; 192/90
(58) Field of Search ................................ 188/158, 171, 188/71.5, 71.6, 264 D, 264 R, 264 E, 264 F, 264 CC, 161; 192/90

(56) References Cited

U.S. PATENT DOCUMENTS

| | | | |
|---|---|---|---|
| 4,821,847 A | * | 4/1989 | Langdon et al. ............. 188/171 |
| 4,921,078 A | | 5/1990 | Sommer |
| 4,938,321 A | * | 7/1990 | Kelley et al. ................ 188/171 |
| 5,186,288 A | | 2/1993 | Sommer |
| 5,195,623 A | | 3/1993 | Sommer |
| 5,285,879 A | | 2/1994 | Sommer |
| 5,323,888 A | | 6/1994 | Sommer |
| 5,360,091 A | | 11/1994 | Sommer |
| 5,454,765 A | | 10/1995 | Sommer |
| 5,487,458 A | | 1/1996 | Sommer |
| 5,533,425 A | * | 7/1996 | Mabee ........................ 188/171 |
| 5,547,431 A | | 8/1996 | Sommer |
| 5,603,395 A | * | 2/1997 | Mabee ........................ 188/171 |

* cited by examiner

Primary Examiner—Paul N. Dickson
Assistant Examiner—Mariano Sy
(74) Attorney, Agent, or Firm—Harness, Dickey & Pierce, PLC

(57) ABSTRACT

An electric motor brake has a printed circuit board which circumferentially locates and. Returns a plurality of electromagnetic coil assemblies within a coil housing. The circuit board simplifies both the assembly and wiring associated with the electric motor brake. The circuit board is located within the coil housing and a stand off located between the printed circuit, board and the coil housing electrically connects the coil stators of each coil assembly with the coil housing. The circuit board connects each third coil assembly in a circular pattern to the same phase of a three-phase AC power source.

14 Claims, 4 Drawing Sheets

ELECTRIC BRAKE

FIELD OF THE INVENTION

The present invention relates to motor brake assemblies. More particularly, the present invention relates to motor brake assemblies incorporating a printed circuit board which simplifies the assembly of the motor brake assembly and provides for the grounding of the stators for the electromagnetic coils.

BACKGROUND AND SUMMARY OF THE INVENTION

A typical brake assembly for an electric motor comprises a stationary brake housing, a brake pack and an actuating mechanism. The brake housing is a stationary housing normally bolted directly to the motor or it is bolted to the motor through an adaptor plate. The brake pack is usually positioned within the brake housing and comprises a rotating member which rotates with the drive shaft of the motor and a fixed portion which is fixedly secured to the brake housing. The brake pack further includes a plurality of driving friction discs which are secured to the rotating member and interleaved with a plurality of driven friction discs which are secured to the fixed member. The actuating mechanism selectively moves the brake pack between an applied condition where the driving and driven discs are compressed together and a released condition where the driving discs are allowed to rotate relative to the driven discs. Thus, the rotation of the shaft of the motor can be stopped or prohibited when the driving and driven friction discs are compressed together by the actuating mechanism.

The actuating mechanism normally comprises an actuating disc which is longitudinally movable within the brake housing between the applied condition and the released condition. In the applied condition, the actuating disc compresses the plurality of driving and driven friction discs between two abutment surfaces to effectively lock the drive shaft of the motor to the stationary brake housing. In the released condition, the actuating disc releases the compressive load on the plurality of driving and driven friction discs and the drive shaft of the motor is allowed to rotate relative to the stationary brake housing. The movement of the actuating disc within the stationary brake housing is typically controlled by a plurality of electromagnetic coils fixedly secured to the stationary brake housing. The electromagnetic coils magnetically attract the actuating disc which then moves longitudinally against a biasing force. The biasing force is normally provided by a plurality of springs which bias the actuating disc away from the electromagnetic coils and into an applied condition for safety reasons although it would be possible to bias the actuating disc into a released condition if desired. When power is supplied to the electromagnetic coils, the actuating disc is magnetically attracted against the biasing load to release or apply the brake depending on its position of the brake due to the biasing load.

The above described prior art motor brake assemblies have been designed to either run dry or they have been designed to be submerged in a cooling fluid operating under the oil shear principle. In simple terms, the oil shear principle is based on the use of multiple interleaved discs bathed in oil. A positive oil film is maintained between each of the disc surfaces. When the interleaved discs are compressed together, torque is transmitted by the viscous shearing of this oil film. The result is that the wear of the friction surfaces on the discs is greatly reduced. In addition, heat is dissipated by the circulating oil for fast cyclic capability.

Prior art motor brake assemblies have the electromagnetic coils circumferentially arranged in an annular recess provided in a coil housing which forms a part of the stationary brake housing. Each individual electromagnetic coil is held in place by a bolt and once located the electromagnetic coils are wired together with power being supplied to the plurality of electromagnetic coils through an access hole extending through the coil housing. In some motor brake assemblies, instead of bolting each electromagnetic coil to the coil housing, the plurality of electromagnetic coils can be wired together and be potted into the annular recess of the coil housing by a non-conductive material such as epoxy. The epoxy will entirely fill the annular recess and cover the electrical connection between the coils.

While these prior art motor brake units are effective, especially when using the oil shear principle, the assembly of the motor brake units has proven to be an especially time consuming and expensive operation. This is particularly true when considering the assembly and wiring of the plurality of electromagnetic coils into the annular recess of the coil housing. In addition, the stators for the electromagnetic coils are not grounded which can lead to the problem of sparking between the stator and a nearby grounded component. Accordingly, what is needed is a cost effective assembly method for locating and wiring the plurality of electromagnetic coils within the coil housing which forms a part of the stationary brake housing. The wiring of the plurality of electromagnetic coils should also include a system for grounding the stators of the coils.

The present invention provides the art with a simplified and cost effective method of locating and wiring the plurality of electromagnetic coils within the coil housing. The present invention utilizes an annular shaped printed circuit board which includes the wiring required to interconnect the plurality of electromagnetic coils and to ground the stators of these coils. Each individual coil is fixedly secured and electrically connected to the annular circuit board. The circuit board includes foil for contacting each of the stators of the coils and circuitry to electrically connect the stators to the motor brake housing using a conductive stand off. In one embodiment, the stand off is integral with the motor brake housing. This assembled circuit board is then located relative to the stand off of the coil housing. Once provisions have been made for providing connection to an external power source, the assembly of the circuit board and the electromagnetic coils can be potted with the coil housing. The use of the printed circuit boards thus eliminates both the circumferential locating of the individual electromagnetic coils as well as the tedious task of wiring each individual electromagnetic coil. Each stator of the coils is electrically grounded and a plurality of holes extending through the circuit board permit the potting material to surround and establish the assembly. Thus, the assembly of the brake unit is simplified and the reliability is significantly improved.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 5 is an electrical circuit diagram provided by the utilization of the circuit board shown in FIGS. 4 and 5.

DETAILED DESCRIPTION OF THE PREFERRED EMBODIMENT

Figure 1:
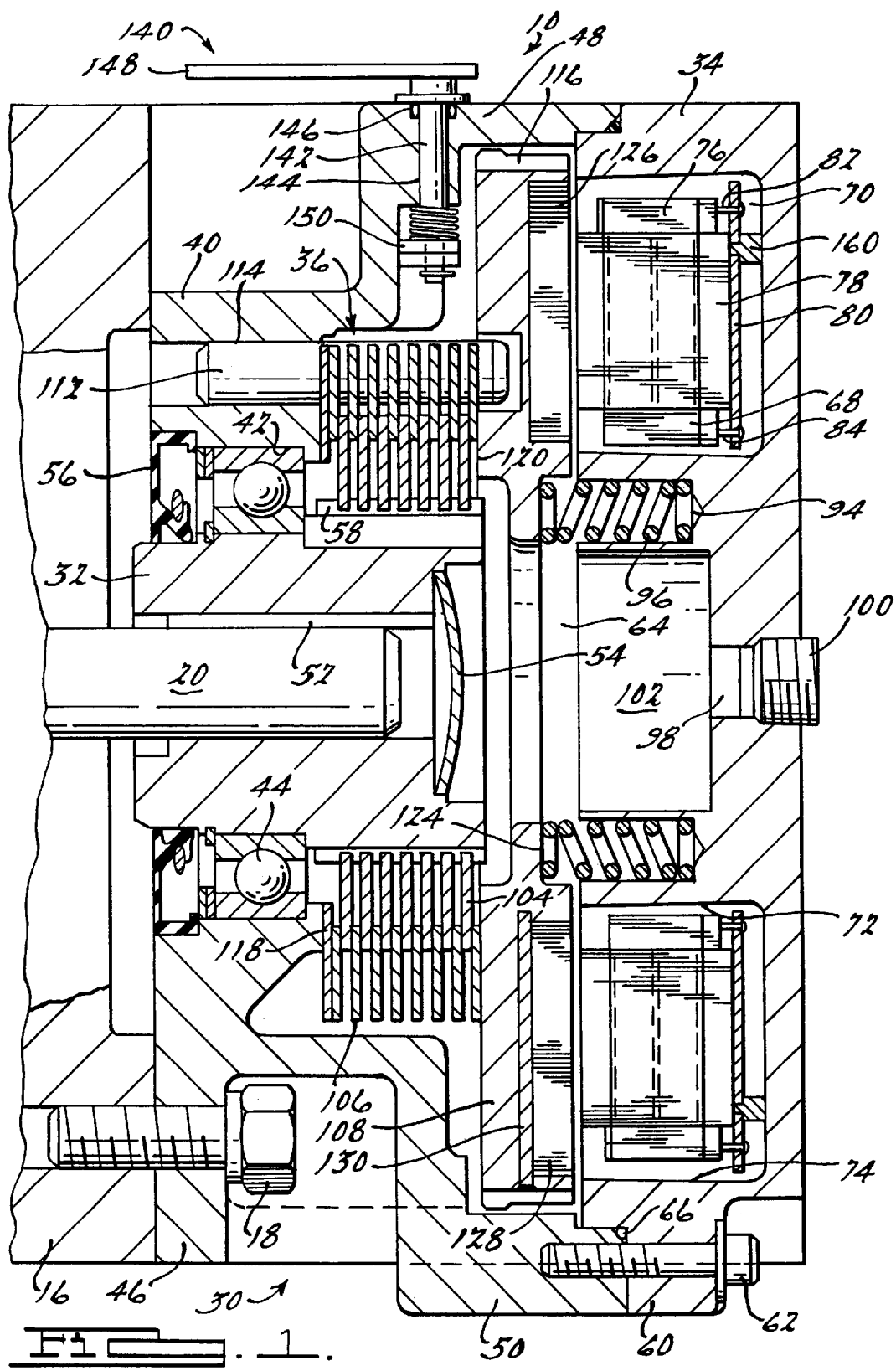
FIG. 1 is a longitudinal side elevational view, partially broken away, of a motor brake unit embodying the principles of the present invention.

Referring now to the drawings in which like reference numerals designate like or corresponding parts throughout the several views, there is shown in FIG. 1 a motor brake assembly embodying the principles of the present invention which is designated generally by the reference numeral 10. For exemplary purposes, motor brake assembly 10 is shown bolted directly to motor 16 by a plurality of bolts 18. Motor brake assembly 10 could be bolted to an adaptor plate (not shown) which would in turn be bolted to motor 16 assuming the bolt patterns on the two components were not the same. Motor 16 includes a rotatable motor shaft 20 extending axially or longitudinally into motor brake assembly 10 to provide for the interface between motor brake assembly 10 and motor 16.

Motor brake assembly 10 comprises a main stationary brake housing 30, a rotatable sleeve 32, an electromagnetic coil housing 34 and an oil shear brake pack 36. Stationary brake housing 30 is an annular housing having a central hub 40 defining a centrally located bore 42 for mounting a roller bearing 44. Roller bearing 44 rotatably mounts rotatable sleeve 32 within brake housing 30 as will be described later herein. A plurality of mounting flanges 46 extend radially outwardly from one end of central hub 40 and are adapted to provide for the attachment of brake housing 30 to motor 16 or the adaptor plate by the plurality of bolts 18. Brake housing 30 is shown bolted directly to motor 16 using flanges 46 and bolts 18. The adaptor plate could be provided in applications where the two bolt patterns do not match. An L-shaped annular section 48 extends radially outwardly from the end of central hub 40 opposite to the plurality of flanges 46. L-shaped section 48 provides clearance for oil shear brake pack 36 and is adapted with a plurality of circumferentially spaced bosses 50 for the attachment of electromagnetic coil housing 34.

Rotatable sleeve 32 extends into motor brake assembly 10 through bore 42 in stationary brake housing 30. Sleeve 32 is rotatably supported by roller bearing 44 and is secured against rotation relative to motor shaft 20 by means of a suitable longitudinally extending keyway 52. The end of sleeve 32 that extends into motor brake assembly 10 is provided with an expansion plug 54 which provides a fluid seal between the interior of sleeve 32 and the interior of stationary brake housing 30. An additional seal 56 is disposed between stationary brake housing 30 and the exterior of sleeve 32 to provide a fluid tight connection between the interior and the exterior of stationary brake housing 30. The exterior surface of sleeve 32 which extends into motor brake assembly 10 is provided with a plurality of axially extending splines 58 for interfacing with oil shear brake pack 36 as will be described later herein.

Electromagnetic coil housing 34 includes a plurality of flanges 60 extending radially outwardly from its exterior surface. The plurality of flanges 60 coincide with the plurality of circumferentially spaced bosses 50 within brake housing 30 to provide for the attachment of coil housing 34 to brake housing 30 using a plurality of bolts 62. Stationary brake housing 30, rotatable sleeve 32 and coil housing 34 define a sealed internal cavity 64. Internal cavity 64 is sealed by expansion plug 54, seal 56 and a seal 66 located between brake housing 30 and coil housing 34.

Figure 3:
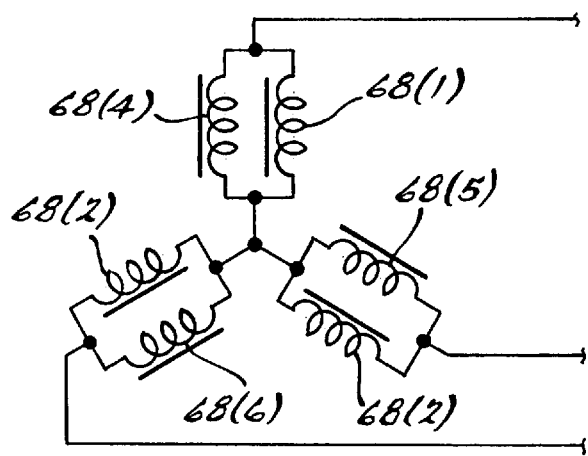
FIG. 3 is a plan view of the top side of the printed circuit board shown in FIGS. 1 and 2 prior to the assembly of the electromagnetic coils.
Figure 3:
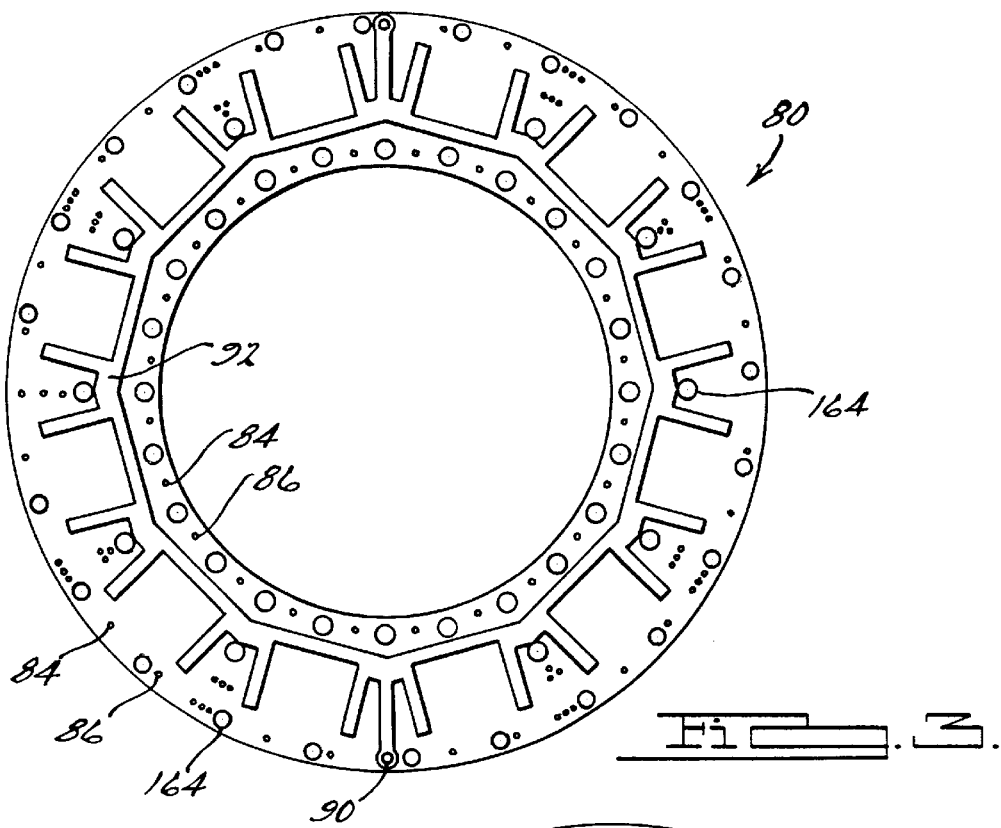
Figure 4:
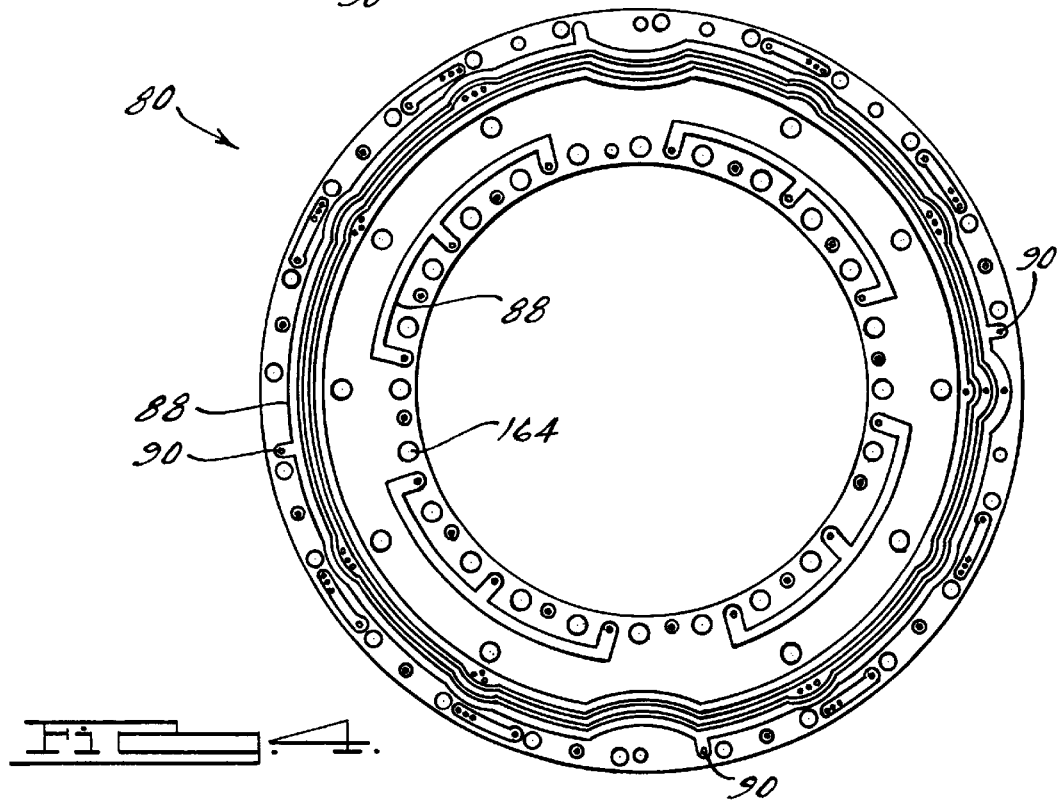
FIG. 4 is a plan view of the bottom side of the printed circuit board shown in FIGS. 1 and 2 prior to the assembly of the electromagnetic coils.

A plurality of electromagnetic coil assemblies 68 are located within an annular chamber 70 located within coil housing 34 radially inward from the plurality of flanges 60. Annular chamber 70 is open to internal cavity 64 and includes an interior tapered wall 72 and external tapered wall 74. Walls 72 and 74 are tapered towards each other to provide for the retention of the plurality of electromagnetic coil assemblies 68 as will be described later herein. Each of the plurality of electromagnetic coil assemblies 68 include coil windings 76 and a coil stator 78 and each electromagnetic coil assembly 68 is fixedly secured to and electrically connected to a printed circuit board 80. A first plurality of pins (not shown) secure each coil assembly 68 to circuit board 80 and a second plurality of pins 82 electrically connect coil windings 76 of coil assembly 68 to circuit board 80. Circuit board 80 is an annular circuit board which is provided with a plurality of mounting holes 84 for mating with the pins for mounting and circumferentially spacing the plurality of coil assemblies 68. An additional plurality of holes 86 are provided through circuit board 80 to mate with pins 82 to provide for the electrical connection of coil windings 76 of the plurality of coil assemblies 68. A plurality of printed circuits 88 interconnect the appropriate plurality of holes 86 and a plurality of terminal locations 90 such that once the plurality of coil assemblies 68 are mounted and electrically connected to circuit board 80, all that is required is to connect terminal location 90 to an external power source and the plurality of coil assemblies 68 will become active. Circuit board 80 also includes a printed circuit 92 which is utilized to ground each coil stator 78. Each coil stator 78 sits on a portion of circuit 92 and circuit 92 is connected to housing 34 as detailed below. The printed circuits are best shown in FIGS. 3 and 4 with FIG. 5 showing the overall electrical circuit provided by utilizing circuit board 80.

Positioned radially inwardly from annular chamber 70 are a plurality of bores 94. Bores 94 extend axially into coil housing 34 and receive a plurality of coil springs 96 which bias oil shear brake pack 36 into an applied condition as will be described later herein. An oil fill port 98 extends through coil housing 34 and is provided with a removable plug 100 for providing access to internal cavity 64. A cylindrical cavity 102 is provided at the center of coil housing 34. Cavity 102 is open to internal cavity 64 and allows for an increased quantity of oil to be supplied to oil shear brake pack 36.

Oil shear brake pack 36 is disposed within interior cavity 64 and comprises a plurality of driving discs 104, a plurality of driven discs 106 and an actuating disc 108. The plurality of driving discs 104 are splined on their interior surface to mate with the plurality of splines 58 located on rotatable sleeve 32. Thus, discs 104 are mounted for rotation with sleeve 32 but are allowed to move axially along sleeve 32 due to their engagement with splines 58. The plurality of driven discs 106 are disposed interadjacent or interleaved between the plurality of driving discs 104. Each of the plurality of driven discs 106 is formed with a plurality of notches (not shown) which are adapted to slidingly engage a plurality of axially extending dowels 112. Each dowel 112 is press fit into a respective bore 114 located within central hub 40 of stationary brake housing 30. Dowels 112 support the plurality of driven discs 106 for longitudinal sliding movement, yet prevent any relative rotation of discs 106 with respect to stationary brake housing 30.

Actuating disc 108 is an annular disc which is disposed between coil housing 34 and the plurality of driving and driven discs 104 and 106, respectively. Actuating disc 108 is located within internal cavity 64 and has a plurality of locating tabs 116 for positioning disc 108 within cavity 64. The exterior diameter which is formed by locating tabs 116 is sized to be slidingly received within the internal diameter formed by L-shaped section 48 of stationary brake housing 30 as shown in FIG. 1. Actuating disc 108 is movable from an applied condition to a released position. In the applied position (to the left as shown in FIG. 1) actuating disc 108 compresses the driving and driven discs 104 and 106 between a first abutment face 118 located on stationary brake housing 30 and a second abutment face 120 located on actuating disc 108. In this position, rotatable sleeve 32 and thus motor shaft 20 are locked to stationary brake housing 30, thus preventing rotation of motor shaft 20. In the released position (to the right as shown in FIG. 1) the driving and driven discs 104 and 106 are allowed to rotate relative to one another thus allowing sleeve 32 and motor shaft 20 to rotate freely. A spring seat 124 is provided at the radial interior of actuating disc 108 and provides a seat for the plurality of coil springs 96 located within the plurality of bores 94. The plurality of coil springs 96 are sized in conjunction with the depth of bores 94 to bias actuating disc 108 to the left as shown in FIG. 1 thus applying oil shear brake pack 34 and locking sleeve 32 and motor shaft 20 to stationary brake housing 30.

Actuating disc 108 further defines an annular chamber 126 which opposes annular chamber 70 located within coil housing 34. Disposed within annular chamber 126 are circular steel. laminations 128. Circular steel laminations 128 are attached to a plurality of circumferentially spaced magnetic plates 130. The attachment of circular steel laminations 128 with the plurality of plates 130 allows the components to be cast into annular chamber 126 during the manufacture of actuating disc 108 to reduce the amount of machining required after forming. Circular steel laminations 128 provide for the magnetic material which is to be attracted by the plurality of coil assemblies 68 thus permitting the remainder of actuating disc 108 to be made from a lighter non-magnetic material preferably aluminum.

Referring now to the overall operation of motor brake assembly 10. The initial conditions are that the interior of cavity 64 is properly filled with a cooling fluid and the plurality of coil springs 96 will function to bias actuating disc 108 toward the left in FIG. 1 whereby the plurality of driving and driven discs 104 and 106 will be compressed between first and second abutment faces 118 and 120 so that an effective braking action is exerted against motor shaft 20. At such time as it is desired to operate the motor, the braked condition is relieved by connecting the source of electricity to coil assemblies 68 approximately the same time that the current is connected to motor 16 to start motor operation. Coil assemblies 68 will magnetically attract actuating disc 108 longitudinally to the right as shown in FIG. 1 against the resistance of the plurality of coil springs 96. This movement will disengage the plurality of driving and driven discs 104 and 106 thereby releasing motor shaft 20. When it is again desired to effect braking of motor 16, coil assemblies 68 are deactivated with the result that the plurality of coil springs 96 will again bias actuating disc 108 toward the left as shown in FIG. 1 again compressing the plurality of driving and driven discs 104 and 106 between first and second abutment faces 118 and 120 thereby effecting the braking of motor shaft 20.

Motor brake assembly 10 may be provided with a manual release 140 which is comprised of a cylindrical shaft 142 rotatably supported within a bore 144 extending through stationary brake housing 30. A seal 146 maintains the integrity of sealed cavity 64. The end of shaft 142 which extends outside of brake housing 30 is provided with a release lever 148 while the end of shaft 142 extending into cavity 64 is provided with a cam 150. Manual release 140 is positioned in relationship to actuating disc 108 such that rotation of shaft 142 by moving release lever 148 causes cam 150 to push against actuating disc 108 and move actuating disc 108 to the right as shown in FIG. 1 against the load exerted by the plurality of coil springs 96. Rotation of shaft 142 in the opposite direction will release actuating disc 108 and again apply braking to motor shaft 20.

The present invention thus provides a unique and simplified assembly for the plurality of coil assemblies 68 within stationary coil housing 34. The plurality of coil assemblies 68 are first mounted and electrically connected to circuit board 80. This assembly of coil assemblies 68 with circuit board 80 locates coil assemblies 68 circumferentially as well as connecting them electrically with the remainder of the coils and the external power source. This assembly is then located within annular chamber 70. A plurality of stand offs 160 extend between circuit board 80 and coil housing 34 to electrically connect printed circuit 92 with housing 34. Stand offs 160 are manufactured from an electrically conductive material to electrically connect printed circuit 92 and thus the plurality of coil stators 78 to housing 34. Stand offs 160 also space circuit board 80 from coil housing 34 to prevent any shorting of the remainder of printed circuits on board 80. Terminal locations 90 of circuits 88 are positioned circumferentially with respect to an access hole 162 extending through coil housing 34 and the appropriate connections for interfacing with the exterior power source are provided. Annular chamber 70 is then filled with a non-conductive epoxy which secures coil assemblies 68 and circuit board 80 within annular chamber 70 due to the taper of walls 72 and 74. The taper in walls 72 and 74 creates an annular chamber which is wider at the base than at the opening. Thus, once the epoxy cures, it is not possible to remove coil assemblies 68 and circuit board 80 from annular chamber 70 without destroying the epoxy structure. During the filling of annular chamber 70 with the non-conductive epoxy, the liquid epoxy will flow through a plurality of holes 164 extending through circuit board 80 in order to ensure the complete fill of chamber 70 with the nonconductive epoxy. Once the epoxy cures, the epoxy which extends through holes 164 will assist in preventing rotation of circuit board 80.

Thus it can be seen that circuit board 80 significantly reduces the labor associated with manually wiring each individual coil 68. In addition, the positioning and locating of the plurality of coil assemblies 68 within annular chamber 70 during the introduction of the epoxy is simplified and accuracy is improved with the utilization of circuit board 80. Finally, the integrity and reliability of the entire system is significantly improved.

Figure 2:
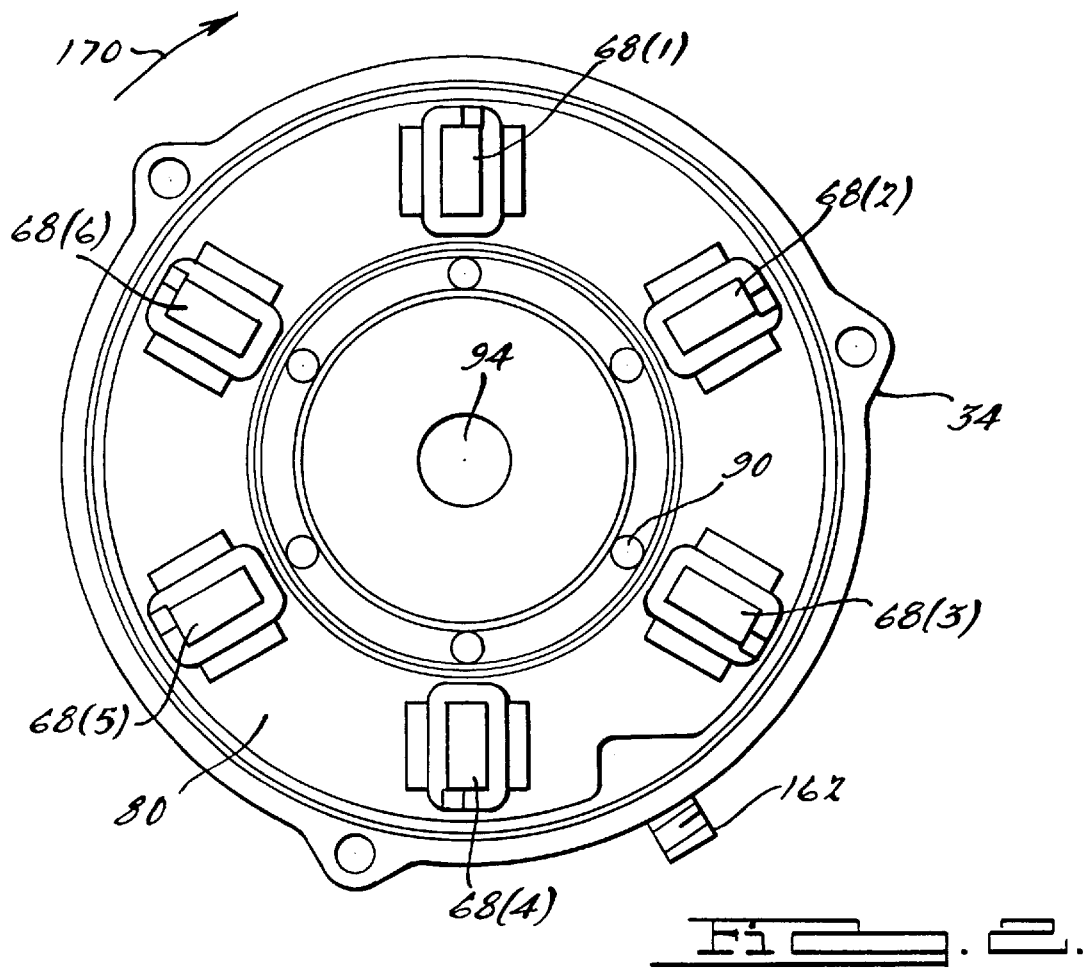
FIG. 2 is a cross-sectional view of the motor brake shown in FIG. 1 taken in the direction of Arrow 2—2.

Referring now to FIGS. 2 and 5, the wiring of the plurality of coil assemblies 68 is illustrated. FIGS. 2 and 5 illustrate an assembly having six coil assemblies 68. These are illustrated as 68(1), 68(2), 68(3), 68(4), 68(5) and 68(6). Coil assemblies 68 are designed for use with three-phase alternating voltage powered devices. Every third coil is connected to one phase of the AC source. Thus, coils 68(1) and 68(4) are connected to the first phase, coils 68(2) and 68(5) are connected to the second phase and coils 68(3) and 68(6) are connected to the third phase. A three-phase AC power source has each phase reaching peak voltage in a cylindrical manner. Thus, coil assemblies 68(1) and 68(4) will reach peak voltage followed by coil assemblies 68(2) and 68(5) followed by coil assemblies 68(3) and 68(6). Consequently, the attractive magnetic force is peaked in coil assemblies 68 in a rotating manner which is designed to be the same rotating direction of disc 108 which is illustrated by arrow 170 in FIG. 2. By utilizing this sequence in a rotational direction, distortion of disc 108 can be minimized. While FIGS. 2 and 5 illustrate six coil assemblies, the same rotational power scheme can be utilized with three coil assemblies 68, nine coil assemblies 68, twelve coil assemblies 68 or any other number of coil assemblies divided by three.

Figure 6:
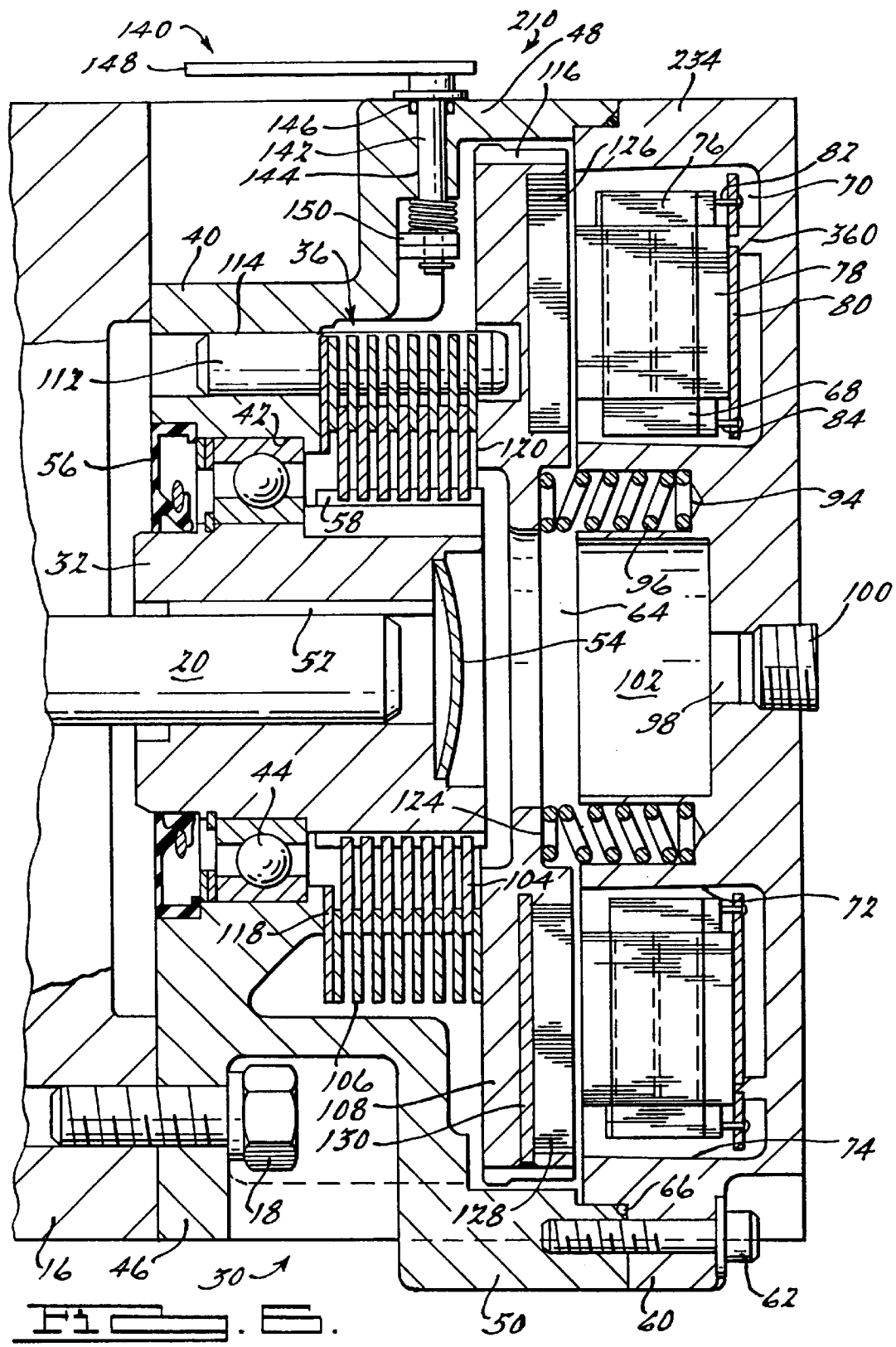
FIG. 6 is a longitudinal side elevational view, partially broken away, of a motor brake unit in accordance with another embodiment of the present invention.

Referring now to FIG. 6, a motor brake assembly 210 is illustrated. Motor brake assembly 210 is the same as motor brake assembly 10 except that electromagnetic coil housing 34 has been replaced with electromagnetic coil housing 234. Coil housing 234 is identical to coil housing 34 except that coil housing 234 includes an integral stand off 360 instead of the plurality of stand offs 160. The function, operation and advantages of motor brake assembly 210 are the same as that described above for motor brake assembly 10.

While the above detailed description describes the preferred embodiment of the present invention, it should be understood that the present invention is susceptible to modification, variation and alteration without deviating from the scope and fair meaning of the subjoined claims.

What is claimed is:

1. A brake unit for an apparatus, said brake unit comprising:
    a main housing defining a cavity, said main housing being adapted to be mounted to said apparatus;
    a coil housing fixedly secured to said main housing, said coil housing further defining said cavity;
    a sleeve member rotatably supported relative to said main housing, said sleeve at least partially disposed within said cavity and adapted to engage a rotatable member of said apparatus;
    a plurality of driving friction discs disposed within said cavity and rotatable with said sleeve;
    a plurality of driven friction discs disposed within said cavity and non-rotatably supported by said main housing;
    an actuating disc axially translatable within said cavity for selectively engaging and disengaging said plurality of driving and driven friction discs; and
    a plurality of electromagnetic coil assemblies fixedly secured to said coil housing; said plurality of electromagnetic coil assemblies each having a coil winding electrically communicating with a printed circuit board and a coil stator electrically communicating with said coil housing, said plurality of electromagnetic coil assemblies being fixedly secured to said circuit board.

2. The brake unit according to claim 1 wherein said cavity is sealed and at least partially filled with a cooling fluid.

3. The brake unit according to claim 1 wherein said circuit board circumferentially locates said plurality of electromagnetic coil assemblies.

4. The brake unit according to claim 1 further comprising a biasing member for urging said actuating disc such that said plurality of driving and driven discs are engaged.

5. A brake unit for an apparatus, said brake unit comprising:
    a main housing defining a cavity, said main housing being adapted to be mounted to said apparatus;
    a coil housing fixedly secured to said main housing, said coil housing further defining said cavity;
    a sleeve member rotatably supported relative to said main housing, said sleeve at least partially disposed within said cavity and adapted to engage a rotatable member of said apparatus;
    a plurality of driving friction discs disposed within said cavity and rotatable with said sleeve;
    a plurality of driven friction discs disposed within said cavity and non-rotatably supported by said main housing;
    an actuating disc axially translatable within said cavity for selectively engaging and disengaging said plurality of driving and driven friction discs; and
    a plurality of electromagnetic coil assemblies fixedly secured to said coil housing; said plurality of electromagnetic coil assemblies each having a coil winding electrically communicating with a printed circuit board and a coil stator electrically communicating with said coil housing; wherein:
        said circuit board and said plurality of electromagnetic coil assemblies are disposed within an annular chamber defined by said coil housing.

6. The brake unit according to claim 5 wherein said annular chamber is at least partially filled with an epoxy.

7. The brake unit according to claim 5 wherein said circuit board provides for the wiring necessary to electrically interconnect said plurality of electromagnetic coil assemblies.

8. A brake unit for an apparatus, said brake unit comprising:
    a main housing defining a cavity, said main housing being adapted to be mounted to said apparatus;
    a coil housing fixedly secured to said main housing, said coil housing further defining said cavity;
    a sleeve member rotatably supported relative to said main housing, said sleeve at least partially disposed within said cavity and adapted to engage a rotatable member of said apparatus;
    a plurality of driving friction discs disposed within said cavity and rotatable with said sleeve;
    a plurality of driven friction discs disposed within said cavity and non-rotatably supported by said main housing;
    an actuating disc axially translatable within said cavity for selectively engaging and disengaging said plurality of driving and driven friction discs;
    a plurality of electromagnetic coil assemblies fixedly secured to said coil housing; said plurality of electromagnetic coil assemblies each having a coil winding electrically communicating with a printed circuit board and a coil stator electrically communicating with said coil housing; and
    a stand off disposed between said printed circuit board and said coil housing, said stand off electrically connecting said coil stators to said coil housing.

9. The brake unit according to claim 8 wherein said stand off is integral with said coil housing.

10. A brake unit for an apparatus, said brake unit comprising:

a main housing defining a cavity, said main housing being adapted to be mounted to said apparatus;

a coil housing fixedly secured to said main housing, said coil housing further defining said cavity;

a sleeve member rotatably supported relative to said main housing, said sleeve at least partially disposed within said cavity and adapted to engage a rotatable member of said apparatus;

a plurality of driving friction discs disposed within said cavity and rotatable with said sleeve;

a plurality of driven friction discs disposed within said cavity and non-rotatably supported by said main housing;

an actuating disc axially translatable within said cavity for selectively engaging and disengaging said plurality of driving and driven friction discs; and a plurality of electromagnetic coil assemblies fixedly secured to said coil housing; said plurality of electromagnetic coil assemblies each having a coil winding electrically communicating with a printed circuit board and a coil stator electrically communicating with said coil housing; wherein:
said plurality of electromagnetic coil assemblies are arranged in a circular pattern and said printed circuit board is adapted to electrically connect every third coil assembly in said circular pattern to a single phase of a three-phase electrical power source.

11. A brake unit for an apparatus, said brake unit comprising:

a main housing defining a cavity, said main housing being adapted to be mounted to said apparatus;

a coil housing fixedly secured to said main housing, said coil housing further defining said cavity;

a sleeve member rotatably supported relative to said main housing, said sleeve at least partially disposed within said cavity and adapted to engage a rotatable member of said apparatus;

a plurality of driving friction discs disposed within said cavity and rotatable with said sleeve;

a plurality of driven friction discs disposed within said cavity and non-rotatable supported by said main housing;

an actuating disc axially translatable within said cavity for selectively engaging and disengaging said plurality of driving and driven friction discs;

a generally circular printed circuit board disposed within an annular chamber located in said coil housing, said annular chamber being open to said cavity; and a plurality of electromagnetic coil assemblies fixedly secured to said printed circuit board in a circular pattern, said printed circuit board being adapted to connect every third coil assembly in said circular pattern to a single phase of a three-phase electrical power source.

12. The brake unit according to claim 11 wherein said cavity is sealed and at least partially filled with a cooling fluid.

13. The brake unit according to claim 11 further comprising a biasing member for urging said actuating disc such that said plurality of driving and driven discs are engaged.

14. The brake unit according to claim 11 wherein said annular chamber is at least partially filled with an epoxy.

* * * * *